United States Patent
Mizuno

[15] 3,667,498
[45] June 6, 1972

[54] WATER SPRINKLING SYSTEM
[72] Inventor: Shuzo Mizuno, Tokyo, Japan
[73] Assignee: Sanko Engineering Company, Limited, Tokyo, Japan
[22] Filed: Dec. 29, 1969
[21] Appl. No.: 888,319

[30] Foreign Application Priority Data
Dec. 26, 1968  Japan....................................43/96273

[52] U.S. Cl............................137/119, 137/624.14, 239/66
[51] Int. Cl. ..........................................A01g 25/00, B05b 9/00
[58] Field of Search ..............137/119, 624.14, 625.44, 467; 239/66

[56] References Cited

UNITED STATES PATENTS

| | | | |
|---|---|---|---|
| 3,119,403 | 1/1964 | Stilwell et al. | 137/119 |
| 2,912,012 | 11/1959 | Klingler et al. | 137/625.44 |
| 2,246,802 | 6/1941 | Kehm et al. | 137/625.44 X |
| 2,266,421 | 12/1941 | Griffith | 137/119 X |

FOREIGN PATENTS OR APPLICATIONS 1,129,119  5/1962  Germany................................137/119

Primary Examiner—Robert G. Nilson
Attorney—Jay M. Cantor

[57] ABSTRACT

A water sprinkling system comprising a main supply conduit and a plurality of branch conduits. Each branch conduit is connected to the main supply conduit by a valve which is constructed to switch the flow of fluid from the branch conduit to the main conduit by cutting off the fluid pressure for a selected time interval. Each valve comprises a pivoted gate which is biased to close the branch conduit and open the main conduit. The gate is pressed by the fluid pressure to close flow to the main conduit and allow flow to the branch. When the supply of fluid is cut off, the gate swings to close the branch and open the main conduit.

19 Claims, 10 Drawing Figures

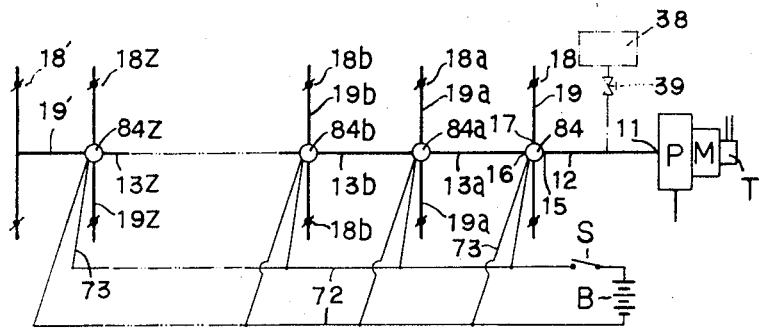
FIG. 8
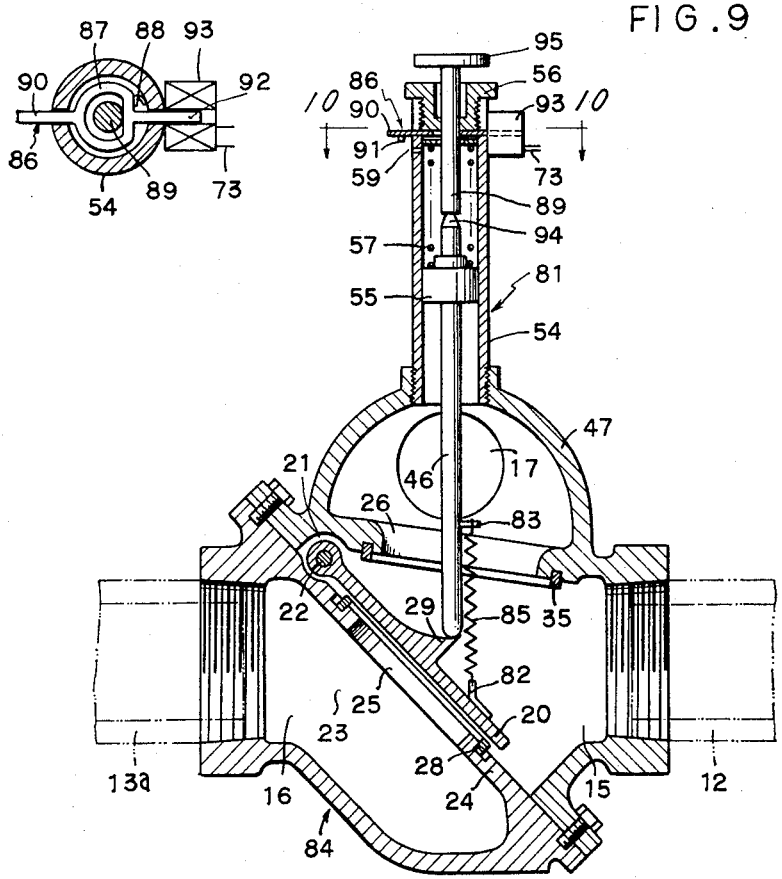
FIG. 10
FIG. 9
INVENTOR.
Shuzo Mizuno
BY Harold L. Halpert
Agent

WATER SPRINKLING SYSTEM

This invention pertains to a water sprinkling system comprising a plurality of rows of sprinkler nozzles wherein the switching from one row of sprinkler nozzles to the next is caused by turning off the main supply for a certain period and then turning on the supply allowing one valve stage and its branch pipe system to be operable at a time. Each valve is reset during the turning off period either manually or by the operation of an automatic resetting valve which operates when the turned off period is fairly long, or a resetting electro-mechanical device utilizing an electrical signal applied during the turned off period.

The object of this invention lies in providing a water sprinkling system wherein a plurality of valves, each with branch pipes and connected in series by a plurality of connecting pipes, where each branch from the first valve to the last is connected to the main supply in sequence one at a time and none simultaneously, thus permitting the use of a constant pressure pump and connecting pipes of approximately the same diameter.

Another object of this invention is to furnish a water sprinkling system which features a lever on each of a series of valves which permits resetting of the valve vane to reconnect each branch to the main supply from the first valve to the last, thus sprinkling from each row of branch pipes one at a time in sequence and simultaneously.

Another object of this invention lies in furnishing a water sprinkling system which features a resetting device for the valve vane which is operated when the turned off period of the main water supply is fairly long causing the valves in the sprinkling system to restart the sprinkling sequence from the first row of sprinklers through the first valve.

Another object of this invention lies in providing a water sprinkling system which has provisions for exhausting the water remaining in the branch pipe or pipes through the outlet port end of the valve (through the valve vane) and thereby assisting the opening of the valve vane and closing of the branch pipe opening, and has provisions for closing the valve vane completely when the vane is in position to turn off the branch pipe or pipes.

A further object of this invention lies in providing a water sprinkling system whereby when the last row of the sprinklers have concluded their sequence of operation, a plurality of electro-magnetic valves, interconnected to the reset device of each valve, is activated and the valve vane of each valve is reset to connect each branch pipe or pipes to the main supply pipe to enable sprinkling to restart from the first row when the main water supply is turned on.

Another object of this invention is to provide a water sprinkling system in which the valve vanes of each valve is reset by means of an electro-magnet mounted thereto, thereby providing means to restart from the first row of sprinklers after any arbitrary row has concluded its sprinkling.

Other features and results of this invention can be readily explained by means of the following drawings wherein:

FIG. 8 is a schematic diagram of another alternate form of piping system,

FIG. 9 is a sectional view of another alternate form of the valve,

FIG. 10 is a section along 10—10 of FIG. 9.

Figure 1:
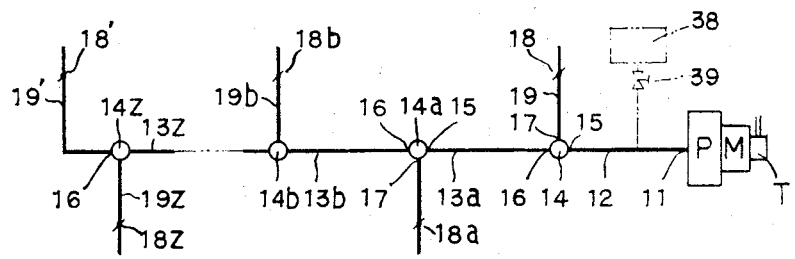
FIG. 1 is a schematic diagram of the piping system of this invention.
Figure 2:
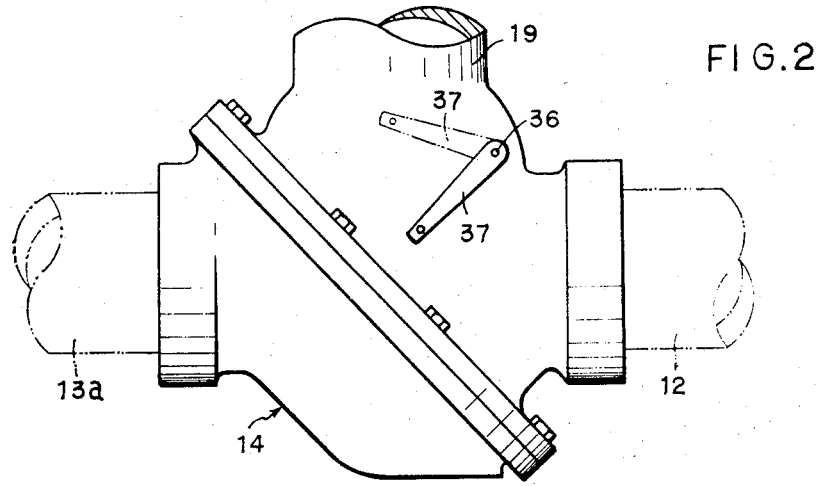
FIG. 2 is a side view of the valve.
Figure 3:
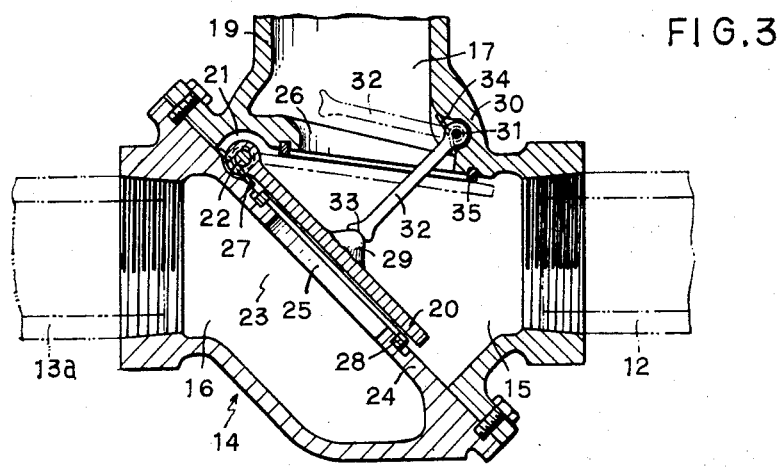
FIG. 3 is a sectional view of the valve.

Referring to FIG. 1, FIG. 2, and FIG. 3, motor M drives pump P which has main supply pipe 1. Connected to outlet port 11 are a plurality of interconnecting pipes 13a, 13b, - - - 13z, of approximately the same diameter as main supply pipe 1, connecting a plurality of identically constructed valves 14, 14a, - - - 14z each of which has an inlet port 15 and outlet port 16 to form a single flow path. Branch port 17 of each valve has branch pipe 19, 19a, 19b - - - 19z connected thereto. Each branch pipe has a plurality of sprinkler nozzles 18, 18a, 18b - - - 18z. Valve 14z at the extreme end of the series, has a closed outlet port or has branch pipe 19' with nozzles 18' mounted thereto. If necessary motor M has timer T to control the operation of motor M so that the time interval for supplying and stopping of the pressurized water to main pipe 12 by pump P can be automatically controlled.

Each of the valves 14, 14a, 14b - - - 14z, of similar construction, has a vane 20 rotatably supported by bearings 21 by shaft 22. Vane 20 serves the purpose of isolating inlet port 15 and outlet 16 by cutting flow path 23 obliquely at approximately 45° when seated on valve seat 24 and valve orifice 25, or cutting flow path 26 between inlet port 15 and branch port 17 in which case the other path is opened. Orifice 25 of valve seat 24 has an elastic ring 28. When water pressure is applied to vane 20, ring 28 is compressed so that leakage through the valve seat is prevented and vane 20 recedes because of the deformation of ring 28.

A protrusion 29 is formed in approximately the center part of vane 20. A holding rod 32 which is rotatably mounted on the opposing valve wall to shaft 22 and bearing 21 by shaft 31 and bearing 30 has an indent 33 formed in its free end. Indent 33 engages the aforedescribed protrusion 29 so that vane 20 is held with a slight gap between seat 28. Shaft 30 has a spring 34 wound thereon, one end of which engages base of rod 32 the other end anchored against the valve's inner surface, to spring load rod 32 to return it upwards through orifice 26.

Orifice 26 has elastic ring 35 around its perifery which prevents leakage when vane 20 closes orifice 26. Shaft 31 which is fixed to rod 32 protrudes through the wall of the valve (depicted at 36) to which lever 37 is fixedly mounted so that by swinging lever 37 rod 32 can be rotated within the valve body.

Pressurized water can be supplied to main supply pipe 12 by a tank 38 with a pressure head or from a dam. 39 is a valve for turning off the supply.

When pressurized water from pump P or tank 38 is supplied through main pipe 12 to first stage valve 14, the water pressure causes valve vane 20 to adhere closely to ring 28 which in turn is compressed and thus permits vane 20 to recede further, protrusion 29 of vane 20 is disengaged from indent 33 formed in the end of rod 32. Rod 32 which is spring loaded, returns upwards through orifice 26 to position indicated by dotted lines. Lever 37 which is fixed to shaft 31 of rod 32 also rotates to the position indicated by dotted lines. Vane 20 keeps orifice 25 firmly closed by the water pressure during the time pressurized water is supplied.

Pressurized water which enters valve 14 is prevented from flowing through flow path 23 by valve vane 20 and therefore passes through branch orifice 26, branch outlet 17 into branch pipe 19 and is sprinkled through a plurality of orifices 18 formed therein.

After sufficient amount of water is sprinkled through the plurality of nozzles 18 formed in branch pipe 19, pump P is stopped or valve 39 of tank 38 is closed and the supply of pressurized water to valve 14 is turned off. Pressure within valve 14 is reduced so that the pressure on vane 20 against valve seat 24 becomes less than the rotating force on valve vane 20 provided by spring 27 on shaft 22 thus vane 20 rotates to open orifice 25 and path 23 and is held against ring 35 of branch orifice 26.

In the next step, pump P is started or valve 39 is opened to supply pressurized water into main supply pipe 12. The pressurized water passes through path 23 of valve 14 of the first stage and through outlet port 16 to connecting pipe 13a and enters second stage valve 14a. Since branch path 26 of the first stage valve 14 is closed by vane 20 pressurized water is turned off from branch 19 and thus there is no sprinkling through nozzles 18.

Pressurized water supplied to second stage valve 14a through connecting pipe 13a is sprinkled through a plurality of nozzles 18a on branch pipe 19a in the same manner as with the first stage valve 14. When the supply of pressurized water is turned off again vane 20 of second stage valve 14a rotates to open by-pass path 23, and closes branch path 26 similar to first stage valve 14. When the pressurized water supply is turned on again, pressurized water passes through first stage valve 14 and second stage valve 14a and is supplied to third stage valve 14b through connecting pipe 13b and water is sprinkled through a plurality of nozzles 18b on branch pipe 19b.

As described above, by turning off the pressurized water supply and through turning on the pressurized water supply again, it is possible to sprinkle consecutively from one stage to the next by means of the sprinklers mounted on the branch pipes branching from the valve of each stage. When the last valve 14z is reached and sprinkling has been accomplished through branch pipe 19z with a plurality of nozzles or pipe 19', or in the event that one desires to recycle when sprinkling has been finished at a certain intermediate stage, lever 37 of each valve is manually returned to its original position. Valve vane 20 is rotated downwards by means of rotating rod 32 which rotates on shaft 31 turned by lever 37.

Protrusion 29 on the valve vane locks with the indent 33 formed on the bottom surface of rod 32. In this manner valve vane 20 is locked in position to close path 23. In this manner all the valves can be locked in the position closing path 23. In this manner it is possible to return all the valves to their original stage prior to supplying pressurized water.

The plurality of branch pipes 19, 19a, 19b - - - 19z has pressurized water supplied to one branch pipe at one time, therefore water supply pump P can be of constant pressure type. Main supply pipe 12 and connecting pipes 13, 13a, 13b - - - 13z which connects valve 14, 14a, 14b - - - 14z can be of the same diameter. Therefore it is possible to realize a greater savings in piping costs when compared with conventional systems. This is a basic feature of this invention.

Figure 4:
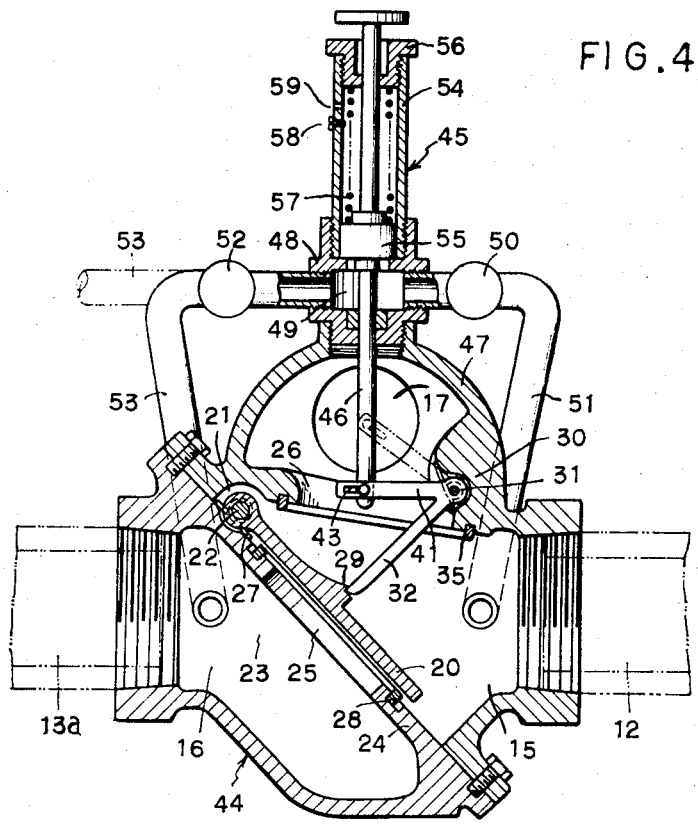
FIG. 4 is an alternative form of valve.

Valve 44 depicted in FIG. 4 is an improved form of the afore described valves 14, 14a, 14b - - - 14z.

Referring to FIG. 4, a pump P driven by motor M, or a tank with a head, or a dam, is connected to main supply pipe 12. A plurality of interconnecting pipes 13a, 13b - - - 13z of approximately the same diameter as main supply pipe 12 interconnects a plurality of valves identical to valve 44, with inlet port 15 and outlet port 16 to form a single flow path. Branch pipes 19, 19a, 19b - - - 19z are connected to branch outlet 17 of each valve.

A plurality of identically constructed valves interconnected as described above has the following construction.

Valve vane 20 is rotatably mounted on bearings 21 by shaft 22.

Vane 20 serves to isolate inlet port 15 and outlet port 16 by cutting flow path 23 obliquely at approximately 45° when closed on valve seat 24 covering orifice 25, or cutting flow path 26 between inlet port 15 and branch port 17 in which case the other path is opened. Vane 20 is spring loaded by spring 27 attached to its mounting parts thus is provided continuously with a rotating force tending to open orifice 25 and close branch path 26. Orifice 25 has elastic ring 28 around its perifery which prevents leakage and also provides elastic means to permit vane 20 to recede further a small distance when pressure is applied.

Vane 20 has a protrusion 29 in its approximate center portion.

Holding arm 32 is rotatably mounted on support bearings 30 by a shaft 31.

On the surface of the valve opposing shaft 22 of vane 20 is a drive arm 41 fixedly attached obliquely to the rotating axis extremity of a support arm 32. Free end of holding arm 32 engages the protrusion 29 of vane 20 and locks the vane in closed position with a slight gap between vane 20 and orifice 25. Elastic ring 35 surrounds branch path 26 to prevent water leakage when vane 20 is closed against branch path 26. Lever arm 41 which is fixed to move with holding arm 32 has an elongated slot 43 at its free end and is connected with the drive rod 46 of valve closing device 45 by a pin.

Valve closing device 45 is mounted on the upper section of the valve body 47. Lower chamber section 48 is fixedly connected to the upper chamber section 45 by a screw fit. Cavity 49 of lower chamber section 48 is connected to the inlet port 15 side of valve 44 through a one-way-flow check valve 50 and pipe 51 and also connects to the outlet port 16 side of valve 44 through control valve 52 and pipe 53. Cylinder 54 with piston 55 forms a crucial part of upper section 45. Piston 55 has piston rod 46 which is movably connected to the aforedescribed vane holding arm. Spring 57 inserted in top section of cylinder 54 is held under compression against piston 55 by screw cap 56 and tends to force rod 46 downwards. Bottom surface of piston 55 is connected to cavity 49 of lower chamber section 48 so that when pressurized water enters through pipe 51 into 48, piston 55 is raised against the bias of spring 57. Screw 58 on side wall of cylinder 54 is a stopper to limit the stroke of piston 55, orifice 59 on upper extremity of the cylinder serves to equalize the pressure on the top side of piston 55 for reciprocal motion.

It has been found feasible to direct pipe 53 as depicted in dotted lines and permit the outflow at a suitable place instead of connecting to the valve near its outlet port 16.

The following explains how this type of valve 44 operates for distributing pressurized water, namely short interval stoppage, long interval stoppage, and operation when water pressure is again applied. When pressurized water is supplied to the first stage valve through main supply pipe 12 from a pump source P, or a tank source 38, valve vane 20 is pressed against elastic ring 27 to deform this ring and recede a small distance. This distance is sufficient to release holding arm 32 from protrusion 29 so that arm 32 and hence drive arm 41 is now free to move.

A portion of the pressurized water within the valve flows through check valve 50 into cavity 49 of lower chamber section 48 and forces piston 55 upwards against force of spring 57 and stops at limiting stopper 58. Rod 46 fixed to piston 55 also rises and this in turn lifts arm 41 and holding arm 32 so that when vane 20 comes into position to close branch path 26 holding arm 32 will not obstruct the vane 20.

The pressurized water entering lower chamber 48 is bled out through regulating valve 52 and exhaust pipe 53. The water removed from the lower chamber is replenished through pipe 51 and the piston 55 and rod 46 remain in the lifted position. Pressure on valve vane 20 keeps valve orifice 25 closed as long as the pressurized water is supplied.

Pressurized water entering valve 44 is sprinkled through a plurality of nozzles 18 mounted on branch pipe 19 in a similar manner to the aforedescribed valve 14. After a suitable quantity of water has been sprinkled, pump P is stopped, or valve 39 of tank 38 is closed, and the supply of pressurized water to valve 44 is turned off. Cessation of the pressurized water supply removes pressure on vane 20 so that the force of spring 27 rotates the vane upwards to open orifice 25 and outlet path 23 and close branch path 26.

Simultaneous to the cessation of the pressurized water supply in valve 44, piston 55 starts moving slowly downwards, pushed by spring 57 within cylinder 54, as water in lower chamber 48 of the vane closing device 45 is bled through control valve 52 and exhaust pipe 53. Piston rod 46 is lowered which in turn lowers the end of lever arm 43 to lower support arm 32 towards its original position.

If pump P, or valve 39 of tank 38 is opened to supply pressurized water to valve 44 before holding arm 32 starts to close vane 20, or before the elapsed time is short enough not to cause considerable closing of vane 20, the pressurized water will pass through outlet side 23 of the first stage valve and will arrive at the second stage valve through outlet port 16 and connecting pipe 13a. Branch path 26 of the first stage valve is closed by vane 20, and pressurized water is not supplied to the branch pipe, thus no water is sprinkled through nozzles 18.

Piston 55 of valve closing device 45 which has moved down a small distance to move piston rod 46 slightly downwards, is again raised as pressure builds up in the first stage valve, and pressure is built up again under piston 55 through supply pipe 51.

Pressurized water supplied to the second stage valve is diverted to branch pipe 19a and sprinkled through a plurality of nozzles 18a similar to the operation of first stage valve 44. When the pressurized water supply is turned off again, through-flow-path 23 of the second stage valve is opened and branch path 26 is closed. When pressurized water is applied after a short time interval of stoppage, the pressurized water will pass through first and second stage valve and will now reach the third stage valve through connecting pipe 13b and sprinkling will be started from the plurality of nozzles 13b on branch pipe 19b.

Every time the pressurized water supply is turned off for a short interval of time, switching occurs from one stage to the next, hence sprinkling through a plurality of nozzles from one stage to the next can be accomplished.

When sprinkling through the last stage branch pipe 19z, or 19', has been accomplished, the pressurized water supply is turned off for a fairly long period of time. With the reduction in pressure caused by turning off of the pressurized water supply, piston rod 46 moves downwards with piston 55. With the downward motion of rod 46, the end of lever arm 41 attached thereto and holding arm 32 fixed to lever arm 41 is rotated to its original position. The end of holding arm 32 pushes valve vane 20 to rotate it against the force of spring 27. Arm 32 continues to rotate vane 20 till its end engages protrusion 29 of valve vane 20 at which point piston 55 and piston rod 46 reach their lowest point, and vane 20 is retained in position to cut off through flow path 23. In this manner as described above, all the valves are reset to their original state prior to when the pressurized water supply was turned on.

The advantageous feature of being able to switch from one stage of sprinklers to the next, stage by stage is sequence, which is a basic feature of this system, is augmented by the aforedescribed feature enabling the whole system to be reset and repeat the sprinkling sequence from the first stage on, when the water supply is turned off for a fairly long time interval.

Figure 5:
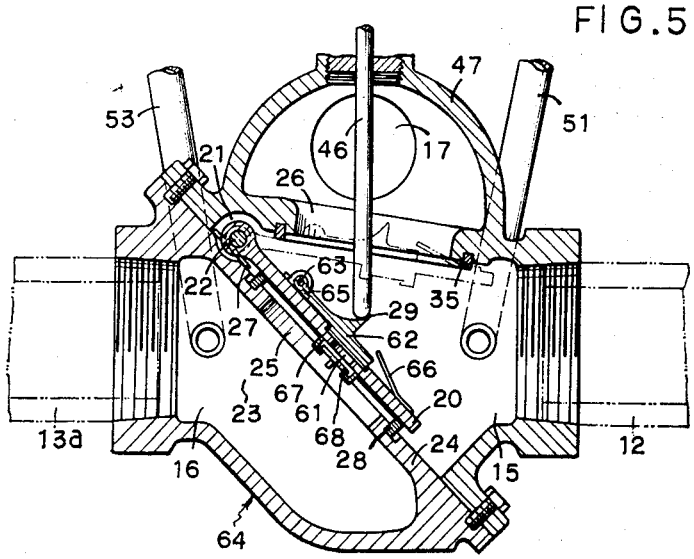
FIG. 5 is an alternative form of valve with part in section.

Valve 64 shown in FIG. 5 is an improved modification of valve 44 as shown in FIG. 4. The valve closing device which is identical to that used in valve 44 is not shown in the drawing.

Valve 64 is connected to pump P driven by motor M, or a tank with a pressure head and an operating valve such as 39, or by a dam, by supply pipe 12 interconnecting pipes 13a, 13b - - - 13z of approximately the same diameter as pipe 12 which connects valves similar to valve 64 just as valves 14, 14a, 14b, similar to valve 44 are connected in FIG. 1. Each valve has a set of branch pipes mounted to its branch outlet 17 and each branch pipe 19, 19a, 19b of each stage has a plurality of sprinkler type nozzles.

The construction of valve 64, a plurality of which are used in the aforedescribed system, is as follows:

Valve vane 20 is rotatably mounted on bearings 21 by shaft 22. Vane 20 serves to cut off through-flow-path 23 between inlet port 15 and outlet port 16 by closing orifice 25 by valve seat 24 which is positioned to cut path 23 at an angle of 45° at which time branch path 26 is opened, or serves to cut off branch path 26 at which time through flow path 23 is opened. Vane 20 is spring loaded, tending to rotate upwards to open orifice 25 and close branch path 26, by spring 27 mounted on the shaft and anchored to the vane and support member. Elastic ring 28 is mounted around the periphery of orifice 25 of valve seat 24. When water pressure is exerted on vane 20, vane 20 is pressed against ring 28 to render the valve seat watertight.

An auxiliary valve orifice 61 is position in the approximate center part of vane 20. Auxiliary valve vane 62 is rotatably mounted by shaft 63 on vane 20 eo enable closing of orifice 61. A fairly strong spring 65 mounted on shaft 63 tends to keep vane 62 from closing orifice 61. A stopper 66 mounted on vane 20 limits the amount of opening of vane 62. A protrusion 29 is formed in the approximate center of vane 62. Orifice 61 has four retaining fingers 67 on the underside of vane 20 which retains check valve vane 68 which serves to close orifice 61 from the underside. Protrusion 29 of auxiliary valve vane 62 is held downwards by spring loaded rod 46 of the valve closing device (not shown). Pipe 51 supplies pressurized water to the valve closing device which raises rod 46. Pipe 53 serves to release (exhaust) the pressurized water from the valve closing device.

The following explains how this modified type of valve 64 operates when the water pressure is first applied, when there is a short interval stoppage, when there is a long interval stoppage, and operation when water pressure is again applied.

When pressurized water is supplied to the first stage valve 64, a part of the water enters the valve closing device through pipe 51. This raises rod 46 and retains it in this position. Vane 20 and auxiliary vane 62, disengage from rod 46, remain closed due to the water pressure.

Pressurized water entering valve 64 is diverted to branch pipe 19 similar to the operation valve 14 or valve 44. After the predetermined amount of sprinkling has been accomplished, the water supply to valve 64 is turned off. The pressure caused by wager in branch pipe 19 prevents vane 20 from opening. Small auxiliary valve 62 has a strong spring causing it to open till it is stopped by stopper 66.

In this manner pressure built up in the branch pipe 19 is released through the auxiliary valve 61 till the pressure is low enough to cause vane 20 to be rotated by spring 27 to open valve orifice 25 and by-pass path 23, and close branch path 26.

When the pressurized water supply is turned off, rod 46 starts to slowly descend, however the descent can be controlled by control valve 52 to descend slowly so that in a short interval of time rod 46 will not prevent vane 20 from closing path 26. When vane 20 closes path 26, which occurs when pressurized water is again turned off after a short interval of stoppage, pressurized water passes through path 23 of the first stage valve and reaches the second stage valve through connecting pipe 13a. Branch path 26 of the first stage valve 64 is closed by vane 20.

Auxiliary port 61 of vane 20 is closed by check valve 68. Thus pressurized water is not supplied to the branch pipe and water is not sprinkled from its nozzles 18. Rod 46 which was lowered slightly is raised again by the pressure and is retained in this position.

Pressurized water supplied to the second stage valve through connecting pipe 13a is diverted to the branch pipe 19a and sprinkling is accomplished through nozzles 18a. When the water supply is turned off again, second stage vane 20 of valve 64 opens path 23 and closes branch path 26. When pressurized water is turned on, after a short interval of time, the water by-passes first and second stage valves and reaches the third stage valve through connecting pipe 13b and sprinkling is accomplished by nozzles 18b of branch pipe 19b.

Every time the pressurized water supply is cut off for a short interval of time switching occurs from one stage to the next and sprinkling through a plurality of nozzles from one stage to the next can be accomplished. When sprinkling through the last stage branch pipes 19z or 19' has been accomplished, or when sprinkling for a predetermined stage has been accomplished, the pressurized water supply is cut off for a fairly long interval of time. When the pressurized water supply is tuned off, rod 46 slowly descends as aforedescribed. The end of rod 46 pushes auxiliary valve vane 62 of vane 20 which heretofore closed branch path 26 and the downward motion of rod 46 ceases when vane 20 is seated on elastic ring 28 of valve seat 24 and this position is retained by rod 46. In this manner all of the valves in the system are reset to their original state prior to when the pressurized water supply was turned on.

The basic feature of being able to switch from one stage of sprinklers to the next stage in sequence, and the augmented feature enabling the whole system to be reset and repeat the sprinkling sequence from the first stage on, when the water supply is turned off for a fairly long interval of time, is further augmented by the aforedescribed feature of being operable even when the pressure in the branch pipe of a stage happened to be high because of a high pressure head.

Figure 6:
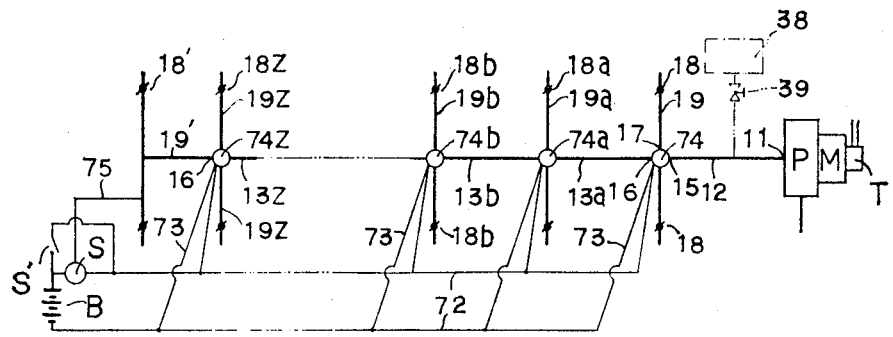
FIG. 6 is a schematic diagram of the piping in an alternative form.
Figure 7:
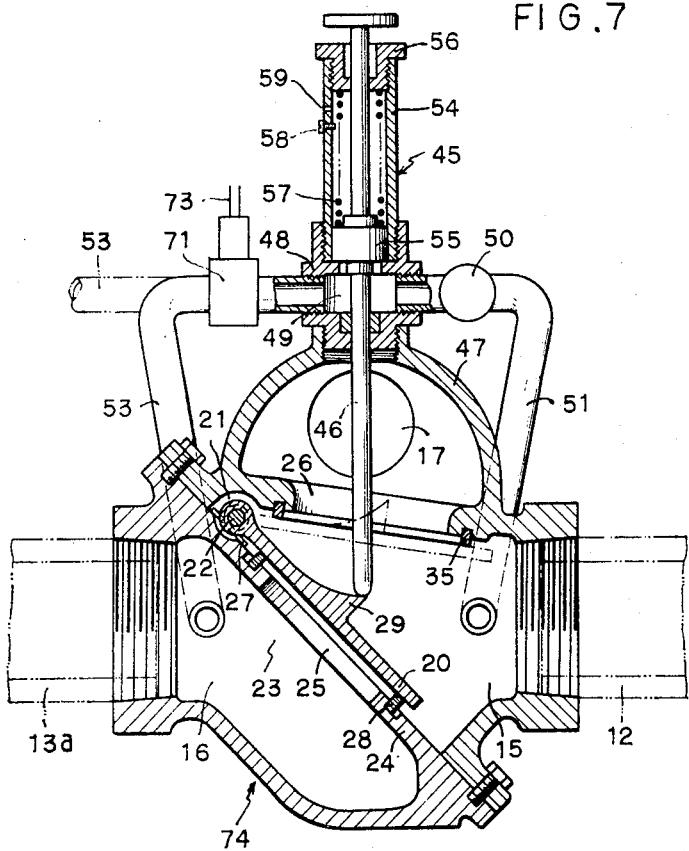
FIG. 7 is a sectional view of an alternative type of valve.

FIG. 6 is a piping and wiring diagram of a modification of the sprinkling system. FIG. 7 is an improved modified type of valve used in this system.

Pump P driven by motor M, or a tank 38 with a head, or a dam is connected to main supply pipe 12, a plurality of interconnecting pipes 13a, 13b - - - 13z of approximately the same diameter as main supply pipe 12 interconnects a plurality of valves of identical construction 74, 74a, 74b - - - 74z, connected in series to form a single flow path. Each valve has branch ports 17 on each side, and branch pipe 19, 19a, 19b - - - 19z with a plurality of nozzles 18, 18a, 18b - - - 18z attached thereto.

Outlet port 16 of the last stage valve 74z has branch pipe 19' with a plurality of sprinkler like nozzles 18'. If necessary a timer device T can be attached to the motor switch to control motor M and automatically control the supply time and the stop time interval of pressurized water to main pipe 12.

Valves 74, 74a, 74b - - - 74z, of identical construction, have a valve vane 20 rotatably mounted on bearings 21 by shaft 22. Vane 20 serves to isolate inlet port 15 and outlet port 16 by cutting flow path 23 obliquely at approximately 45° when closed on seat 24 with orifice 25, or cutting flow path 26 between inlet port 15 and branch port 17 when one port is closed and the other is automatically opened.

Vane 20 is spring loaded by spring 27 attached to its mounting parts to provide a continuous rotating force to open orifice 25 and close branch path 26. Elastic ring 28 is mounted on the perifery of valve orifice 25 of valve seat 24. When water pressure is applied to vane 20, the vane is pressed tightly against ring 28 to render the seal watertight. Elastic ring 35 mounted around branch path 26 renders the seal between vane 20 and the ring 35 watertight.

A valve closing device similar to what has been already described in mounted on upper half of the valve body 47. Pipe 53 which serves to remove water from cavity 49 of lower chamber 48 has electro-magnetic valve 71, which is normally closed; instead of bleeder valve 52 aforedescribed. The electro-magnetic valve is opened when a signal is applied as described hereunder.

Valve vane 20 is held downwards against its valve seat 24 by piston rod 46 to close orifice 25.

Valve vane closing device 45 is mounted on all the valves 74, 74a, 74b - - - 74z. Electro-magnetic valve 71, inserted in exhaust pipe 53, is connected to main wiring 72 by branch wires 73. Power source B and switch S is inserted in wiring 72. Switch S which is connected to the branch pipe 19' or 19z of the last stage valve 74z by means of connecting pipe 75 operates as follows. When pressure is applied to the switch through pipe 75 and the supply is then cut off, and the pressure allowed to drop, the switch closes for a short period of time and then is opened again.

The operation of this type valve 74, 74a, 74b - - - 74z, namely application of pressurized water, stoppage of the supply, reapplication of the water supply, is practically the same as the previously described valves. Nearly the total volume of pressurized water applied to the first stage valve 74 is sprinkled through a plurality of nozzles 18 of a pair of branch pipes 19. A part of the pressurized water is fed into the valve closing device 45 through pipe 51. Piston 55 lifts push rod 46. The water entering valve opening device 45 is held within the device by nonreturn valve 50 and closed electro-magnetic valve 71, thus water does not flow outside of the device. Push rod 46 attached to piston 55 is kept in the lifted position until electro-magnetic valve 71 is opened.

After a predetermined amount of water has been sprinkled from nozzles 18, the pressurized water supply is turned off.

As aforedescribed, valve vane 20 rotates to open valve orifice 25 and through-flow-path 23 while branch path 26 is closed. When the pressurized water supply is again turned on, pressurized water passes through first stage valve 20 and connecting pipe 13a to second stage valve 74a, valve closing device 45 is activated and push rod 46 is pulled upwards, and is held in its place.

Every time the pressurized water supply is turned off, and then restarted, sprinkling from the next row of nozzles on the branch pipes of the next stage is started. When the pressurized water supply is supplied to the branch pipes 19' of the last stage valve 74z and the supply is then turned off, the water pressure in branch pipe 19', connected to switch S through pipe 75, will close the switch. Circuit 72 is closed by the closing of switch S. Current through branch connections 73 to each stage opens electro-magnetic valves 71.

The water contained in the bottom chamber of valve opening device 45 is forced out through electro-magnetic valves 71 by piston 55 and spring 57. Push rod 46 which is fixed to piston 55 is lowered to rotate vane 20 to close tight against valve seat 24 and close valve orifice 25. In this manner all the valve closing devices will return all the valves in the system to close and render the system exactly like what it was at the beginning of the operational sequence. Switch S remains closed till the pressure inside branch pipe 19' is reduced to a little over its minimum value. As it reaches its minimal value, switch S is opened and circuit 72 is opened, and all the valves become closed. There is a manually operated switch S' in parallel to switch S. The system can be recycled after sprinkling in any stage has been completed, in other words when the sprinkling through an arbitrary stage has been completed and the pressurized water supply has been turned off, it is possible to restart from the first stage valve and on to the next.

FIG. 8 is a piping and wiring diagram of still another type of sprinkling system. A series of valves 84, 84a, 84b - - - 84z is interconnected by connecting pipes as shown in FIG. 6, to form a flow path. The same components depicted in FIG. 6 have their numbers used in FIG. 8. Valves 84, 84a, 84b - - - 84z of identical construction have a valve vane 20 rotatably mounted on bearings 21 by shaft 22, valve seat plate 24 cuts flow path 23, formed by inlet port 15 and outlet port 16, obliquely at a 45° angle. Vane 20 in conjunction with valve seat plate 24 closes its orifice 25 or closes branch path 26 between inlet port 15 and branch port 17. Orifice 25 of valve seat 24 has elastic ring 28 mounted on its periphery. When pressure is applied to vane 20, vane 20 and ring 28 are pressed closely to form a watertight seal. Elastic ring 35 is mounted on the periphery of branch path 26, when valve vane 20 closes on branch path 26 a watertight seal is also produced.

Valve closing device 81 (FIG. 9) mounted on the upper part of valve of valve body 47 has push rod 46 attached to the bottom side of piston 55 sliding within cylinder 54. Piston 55 is loaded on its top surface by spring 57. Which tends to lower push rod 46 to engage protrusion 29 formed on the approximate center of valve vane 20. A hook 82 mounted on the top surface of vane 20 and a pin 83 embedded in the side of push rod 46 served to anchor the ends of spring 85. Cap 56 screw fitted to close the top of cylinder 54 has locking device 86 mounted on cylinder 54, immediately below cap 56, is slidably mounted thereto to slide horizontally to the cylinder axis. Locking device 86 has a ring section 87 (FIG. 10). Spring 88 is inserted between the inner wall of cylinder 54 and ring section 87. Upper rod 89 fixed to the upper surface of piston 55 and the inner surface of ring 87 are pressed against each other by spring 88. Pin 91, protrudes from under surface of protrusion 90. Armature 92 which extends from ring 87 slidably fits electro-magnet 93 fixed to cylinder 54. Upper rod 89 has ring shaped groove 94 machined in a suitable position. Knob 95 is attached to the upper extremity of rod 89. Valve closing device 81 of the total series of valves 84, 84a, 84b - - - 84z has electromagnet 93 connected by branch wire 73 to main wiring 72. Main circuit 72 has power supply B and switch S.

The operation of this type valve 84, 84a, 84b - - - 84z as related to the supplying of pressurized water, stoppage of pressurized water, resupplying of pressurized water, are essentially the same as described in the case of other types of valves. Pressurized water supplied to first stage valve 84 is almost totally sprinkled through a plurality of nozzles 18 attached to the two branch pipes 19. A part flows to the under surface of piston 55 of cylinder 54 and lifts piston 35 and push rod 46 against spring 57 with upper rod 89. When ring shaped part of locking plate 87 is locked with ring shaped groove 94 formed in the upper rod 89 the inner surface of locking plate 87 engages groove 94 by the force of spring 88 and piston 55, push rod 46, and upper rod 89 are held in the lifted position. With valve vane 20 closing orifice 25, the lifting of push rod 46 tends to stretch spring 85 bridged between vane 20 and push rod 46.

After a predetermined quantity of water is sprinkled through nozzles 18 the pressurized water supply is turned off. Water pressure ceases to act against valve vane 20 and vane 20 rotates upwards by the pull of spring 85. When orifice 25 is opened and branch path 26 is closed, the supply of pressurized water is again resumed. Pressurized water passes through first stage valve 84 and connecting pipe 13a and is supplied to second stage valve 84a, where water is sprinkled through nozzles 18a of branch pipes 19a. Second stage valve vane closing device 81 is activated and push rod 46 is elevated and held in this position, spring 85 is stretched by the lifting of push rod 46 and remains stretched.

When the pressurized water supply is turned off and then turned on, water can be sprinkled from the plurality of nozzles in the branch pipes of the next stage. Switch S is closed when sprinkling has been completed from nozzles 18' of branch pipes 19' of the last stage valve 84z, or when sprinkling has been completed from any arbitrary stage. With the closing of switch S circuit 72 is closed, all the electro-magnets 93 are energized and locking device 86 is pulled against its retarding spring 88 till ring portion 87 of locking device is disengaged from groove 94 of upper rod 89. In this manner upper rod 89, piston 55, push rod 46, is pushed downwards by spring 57. Valve vane 20 is pushed and rotated to open branch path 26 and close vale orifice 25. In this manner all the valves and valve vane closing devices are returned to their initial positions, in other words, in position to start sprinkling from the first stage branch pipe.

When there is a branch pipe from which sprinkling is not desired, knob 95 of valve closing device for the valve from which the pipe branches is pulled manually upwards so that the grooved part 94 of upper rod 89 and ring plate 87 of locking device 86 are interlocked. Valve vane 20 closes branch path 26 so that pressurized water passes through the valve and water sprinkling is not initiated. Ring shaped groove 94, to which upper rod 86 locks, can be disengaged manually to return vane 20 without resorting to the electromagnet 93.

To the feature of being able to supply pressurized water from a plurality of branch pipes in sequence one after the other and only from one at one time, is added the feature of being able to sprinkle from the next stage and then the next in series by means of turning off the pressurized water supply and then by turning on the supply independent of the time involved or lapsed during the stopping of the supply.

Another additional feature lies in the ability to restart sprinkling from the first stage again in sequence, when the predetermined amount of sprinkling has been accomplished from the branch pipes of the last stage, or any arbitrary stage in the system. Another feature is in being able to prevent sprinkling from any arbitrary branch pipe.

What I claim is:

1. A valve comprising a valve body, a pair of partitions dividing the body into an inlet chamber and a pair of outlet chambers, an orifice in each partition for providing a flow path from the inlet chamber to each outlet chamber, a vane pivotally mounted in the body for pivotal movement to close each said orifice, resilient means urging the vane to close one orifice, means for moving the vane against the bias of the resilient means to close the other orifice, and to retain it in closed position, and means responsive to high water pressure in the inlet chamber for removing the retaining means.

2. A valve as defined in claim 1 wherein the moving and retaining means comprises a rod, means mounting the rod for reciprocating movement in a path engaging the vane, and spring means biasing the rod into contact with the vane.

3. A valve as defined in claim 2 further including a fluid motor for shifting the rod out of contact with the vane and compressing the spring means to store energy therein, and means for locking the rod in said last mentioned position.

4. A valve as defined in claim 3 wherein the means for locking the rod comprises the fluid motor and means for trapping the fluid to prevent motion of the motor.

5. A valve as defined in claim 4 further including means for discharging the fluid from the motor.

56. A valve as defined in claim 5 wherein said discharging means comprises a bleed valve for regulating the rate of discharge.

7. A valve as defined in claim 6 wherein said vane includes and orifice, a second vane pivoted thereon to close the orifice and in the path of reciprocation of the rod whereby pressure of the rod pivots both vanes toward orifice closing position.

8. A valve as defined in claim 5 wherein said discharging means comprises an electro-magnetically operated valve.

9. A valve as defined in claim 3 wherein the means for locking the rod comprises a notch in the rod, and a locking finger engaged in the notch.

10. A valve as defined in claim 9 further including an electro-magnet for disengaging the finger from the notch.

11. A valve according to claim 1 wherein the means for moving and retaining the vane in closed position comprises a pivotal member swingable against a biasing force to engage the vanve, means on the vane to engage and retain the member thereon against its bias when in closed position, the means for removing the retaining means comprising a resilient ring about the other orifice against which the vane seats and cooperating with the biasing means for the member, whereby water pressure in the inlet chamber moves the vane away from engagement with the member in a direction to compress the ring and return control of the member to its biasing means.

12. A valve according to claim 1 wherein the means for moving and retaining the vane in closed position comprises a pivoted means biased to swing in one direction into engagement with the vane to move it to closed position, means on the vane when in closed position to restrain it against movement in the opposite direction, the means for removing the retaining means comprising a resilient ring about the other orifice against which the vane seats and compressible by the vane when subject to water pressure in the inlet to permit movement of the vane away from the member, and means responsive to said water pressure for moving the member in the opposite direction.

13. A valve comprising a valve body, a pair of partitions dividing the body into an inlet chamber and a pair of outlet chambers, an orifice in each partition for providing a flow path from the inlet chamber to each outlet chamber, a vane pivotally mounted in the body for pivotal movement to close each said orifice, resilient means urging the vane to close one orifice, and means for locking the vane adjacent the other orifice, the means locking vane adjacent the other orifice comprises a rod pivotally mounted in the body on one side of said one orifice and extending therethrough into the locking engagement with the vane, and means urging the rod to pivot into a storage position into one of said outlet chambers on said one side of said one orifice.

14. A valve as defined in claim 13 further including means external the body for pivoting the rod into said locking engagement.

15. A valve as defined in claim 14 wherein the means external of the body comprises a spring motor and further including means responsive to fluid pressure in the inlet chamber for compressing the spring and urging the rod into the storage position.

16. A valve as defined in claim 15 wherein said responsive means comprises a fluid motor, an inlet conduit connecting the motor with the inlet chamber, a check valve in said inlet conduit for preventing flow of fluid from the fluid motor toward said inlet chamber, an exhaust conduit connecting the fluid motor to a discharge zone for exhausting the fluid, and a valve in said discharge conduit for exhausting the fluid from the motor at a preselected rate.

17. A valve as defined in claim 14 wherein the means external the body comprises a rod pivotally mounted on an axis concentric with the pivotal mounting of the rod.

18. A valve as defined in claim 13 wherein said locking means comprises a projection on the vane and a recess in the end of the rod receiving the projection, and means mounting the vane for pivoting movement to withdraw the projection from the recess.

19. A valve as defined in claim 13 wherein said locking means comprises a projection on the vane for engagement with the end of the rod, and means mounting the vane for pivoting movement to withdraw the projection from engagement with the rod.

* * * * *